Figure 1:
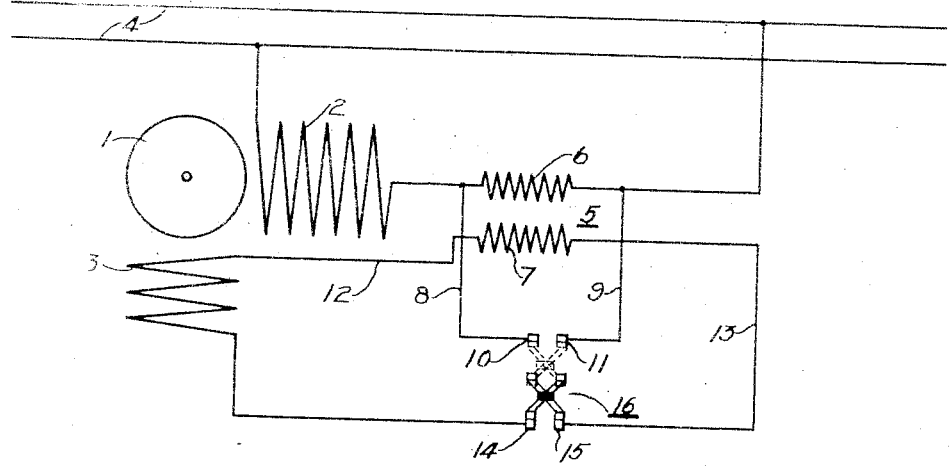

C. A. M. WEBER.
SINGLE PHASE MOTOR.
APPLICATION FILED JUNE 29, 1918.

1,433,765.

Patented Oct. 31, 1922.

Patented Oct. 31, 1922.

1,433,765

UNITED STATES PATENT OFFICE.

CLIFFORD A. M. WEBER, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SINGLE-PHASE MOTOR.

Application filed June 29, 1918. Serial No. 242,629.

*To all whom it may concern:*

Be it known that I, CLIFFORD A. M. WEBER, a citizen of the United States, and a resident of Edgewood Park, in the county of Allegheny and State of Pennsylvania, have invented a new and useful Improvement in Single-Phase Motors, of which the following is a specification.

My invention relates to self-starting single-phase motors, having particular relation to induction motors of the squirrel-cage type which are started by the use of split-phase windings, and it has for its object to provide a motor of the above designated type which shall have all of the advantages of high starting torque which are obtainable from the use of a split-phase winding, and, at the same time, shall be free from the disadvantages which have hitherto attached to this type of motor on account of the inductive effects which are inherent therein.

In order to obtain the high starting torque which is necessary in this type of motor, it is the usual practice to provide a split-phase winding of one character or another, which will give currents differing in phase relationship, and these motors will, therefore, usually be provided with main field windings and auxiliary starting windings, these windings carrying currents which are out of phase, but not nearly in quadrature relation to each other.

The starting torque of such a split-phase squirrel-cage induction motor is directly proportional to the ampere turns in the auxiliary starting winding and the sine of the angle between the currents in the main field and the auxiliary starting winding, while it is inversely proportional to the ampere turns in the main field winding. It is apparent, therefore, that an increase of the angle between the current in the main field and that in the starting winding increases the torque in proportion to the sine of the angle. If, however, the ampere turns in the auxiliary starting winding circuit are decreased, the same starting torque may be maintained, on account of the effect of the increased angle. Again, if the number of effective turns in the auxiliary starting winding is increased and the current in said winding lowered, it is apparent that the same starting torque may still be obtained if, at the same time, the angle between the two currents can be brought closer to 90 degrees.

To provide such an arrangement of field windings in which the currents will be more nearly in quadrature, I provide main field windings and auxiliary starting windings displaced as is usual, 90 degrees with respect to each other, and, in addition, provide a transformer which is connected in series relationship with the main windings, the auxiliary starting-winding circuit being connected to the secondary of said series transformer. This arrangement will bring the currents flowing in the main winding and the auxiliary winding into substantially quadrature relationship.

After such a single-phase motor has been started by the above designated arrangement, it is highly desirable, in the majority of cases, that the inductive effects which arise from the insertion in the main line of the transformer coil, be dispensed with. In some cases it may be desirable to open only the auxiliary starting circuit while, in other cases, such as strictly torque motors, it may even be desirable to allow the transformer coil to remain in circuit, since the inductive effect suffered thereby will not prove serious.

To the accomplishment of the above end, I have provided means which will automatically not only open circuit the auxiliary starting winding, but, at the same time, will cut out all of the inductance device which has been instrumental in providing an approximately quadrature current for starting.

Figure 2:
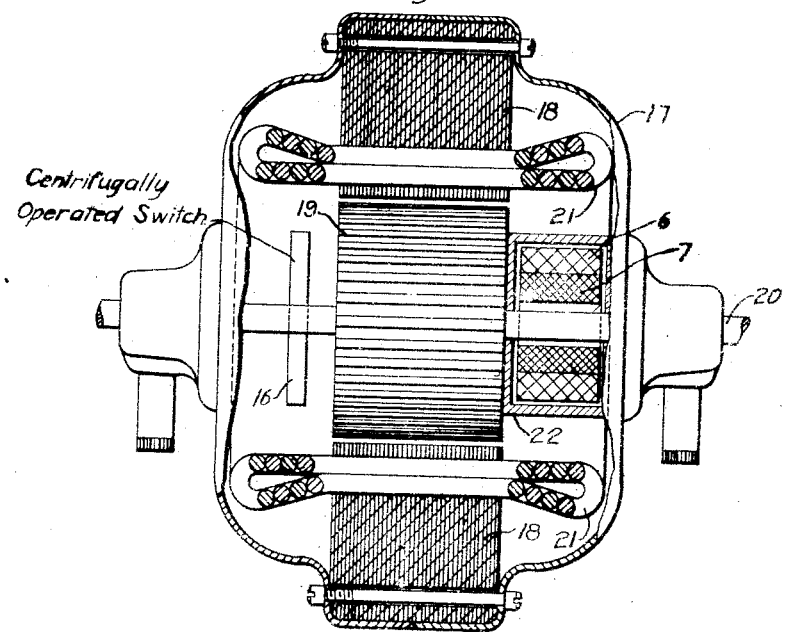

For a better understanding of my device, reference may be had to the accompanying drawings, in which:

Fig. 1 is a diagrammatic view of the connections which I use in the control of a single-phase induction motor, while Fig. 2 represents an elevational view, partially in cross section, of the motor in which is shown a compact arrangement of the inductance device of which I make use.

Referring now more particularly to Fig. 1, a squirrel-cage induction motor 1 is shown, said motor being provided with a main field winding 2 and an auxiliary starting winding 3, said main field winding 2 being connected directly across supply mains 4. An inductive device 5 is provided for the purpose of obtaining a quadrature relationship of the currents flowing through inductively related coils 6 and 7, said coils being connected in series-circuit relationship with the main field winding 2 and the auxiliary field winding 3, respectively.

The coil 6 is connected, by means of leads 8 and 9, to contact terminals 10 and 11, said contact terminals 10 and 11 constituting, in part, means whereby the coil 6 may be short-circuited and its inductive effect thereby dispensed with. Similarly, the coil 7 is connected by leads 12 and 13 to contact terminals 14 and 15, which may be either short-circuited or open-circuited at will, thus providing means whereby the auxiliary field winding 3 may be rendered electrically non-responsive. A short-circuiting device 16, which is preferably of the centrifugally-operated type, is used in the manner indicated to simultaneously short-circuit the coil 6 and open-circuit the coil 7 and the auxiliary winding 3. While I have shown the device 16 as a centrifugally-operated switch, it is obvious that any other suitable means may be provided for the same purpose. However, by the use of a switch which is operated in the manner shown, a very compact self-contained starting mechanism is provided for a single-phase motor.

Referring now to Fig. 2, the manner in which I place the inductance device 5 and the centrifugally operated switch 16 in the motor casing in order to obtain a compact structure, is shown.

In this figure, the motor 1 is shown as provided with a casing 17 which is partially broken away to show the interior arrangement of stator 18 and a squirrel-cage rotor 19. The rotor 19 is mounted on a shaft 20, the bearings for which are housed in the ends of the casing, as shown. It will be observed that the ends turns of field windings 21 project somewhat beyond the ends of the rotor 19 and the sides of the field-magnet pole pieces 18 and that, therefore, a space of sufficient size is left between the rotor ends and the casing 17 in which the inductance device 5 may be placed, if the same is properly designed. A return magnetic path is afforded the flux from the inductive device 5, by member 22 which surrounds the device and by the enclosed portion of the shaft, this arrangement leaving only small air gaps in the flux path. The centrifugally-operated switch 16 may be mounted on the shaft and within the motor casing at the end opposite to that which encloses the coils 6 and 7. By placing both starting devices within the motor casing a completely self-contained single-phase motor is provided which may be automatically started without the interposition of manually operated switches and other undesirable features.

By mounting the inductance device 5 in the manner shown in Fig. 2, namely, so that a portion of the shaft will serve as the core of said inductance device, it will be apparent that double use is made of the material of which the shaft 20 is composed. While I have shown a portion of the shaft as constituting the core, it is obvious that, under certain circumstances, it may be desirable to surround the shaft 20 with a core member rather than to utilize the shaft itself as such member.

The operation of my starting device is as follows: When power is impressed across the terminals of the main field winding 2, there will be set up, by inductive action, currents in the coils 6 and 7 substantially 90° apart in phase relationship, and these currents will, in turn, upon traversing the main field winding and the auxiliary field winding, produce a torque which will be sufficient to start the motor and accelerate it to a predetermined speed.

Upon said predetermined speed being reached, the centrifugal device 16 will operate and will simultaneously short circuit the coil 6 through the contact terminals 10 and 11 and produce an open circuit in the auxiliary field winding 3 at contact terminals 14 and 15.

It will be observed that the operation of the centrifugally actuated switch is such that both of the above designated changes of connection will take place simultaneously and at a predetermined speed. It will be apparent, therefore, that, under normal conditions, no inductance remains in circuit with either the main field winding or the auxiliary field winding and that, therefore, the motor will be running at a power factor dependent only on its own inherent inductive qualities.

Of course, it may, at times, be desirable to keep the coil 6 in circuit, in case its inductive effect is not serious, and this may readily be provided for by adjusting the switch 16 in such manner that contact terminals 10 and 11 are not closed.

By reference to the above description, it will be apparent that, through the use of the starting device shown, said device being rendered inoperative immediately after the starting of the motor, I may be able to obtain the high efficiency which is inherent in high power factor operation during the running period. That is, by completely eliminating not only the inductance device which was used for starting but also the auxiliary starting winding, the inductive effects which are usually quite pronounced in this type of motor are entirely avoided. However it is also apparent that, by the use of coils in transformer relation, as shown, an extremely high starting torque will be obtained, on account of the currents in the two coils being in substantially quadrature relationship.

In this connection, I wish to be understood that an auto transformer may be used, if desired, and the same results will be obtained throughout the operation of the motor.

While I have shown but one type of my improved starting device, it will be understood that I wish the appended claims to be interpreted as broadly as the prior art will permit.

I claim as my invention:

1. The combination with a source of alternating current and an electric motor of the single-phase induction type adapted to be connected thereto and comprising a main field-magnet winding and an auxiliary starting winding, of a transformer having its primary winding connected in series-circuit relation with said main field winding and its secondary winding connected across the terminals of said auxiliary winding, and means for removing said primary winding from operative relationship with said main field-magnet winding.

2. The combination with a source of alternating current and an electric motor of the single-phase induction type adapted to be connected thereto and comprising a main field-magnet winding and an auxiliary starting winding, of a transformer having its primary winding connected in series-circuit relation with said main field winding and its secondary winding connected across the terminals of said auxiliary winding, and means for simultaneously removing said primary winding from operative relationship with said main field-magnet winding and substantially open-circuiting said auxiliary winding.

3. The combination with a single-phase induction motor comprising a main field-magnet winding and an auxiliary starting winding, of a transformer having a primary winding in series with said main field-magnet winding and a secondary winding connected to said starting winding, and automatic means operating to de-energize said transformer and said auxiliary starting winding at a predetermined time.

4. The combination with a motor comprising a main field-magnet winding, and an auxiliary starting winding, of a device for controlling the operation of said motor comprising inductively related coils, and automatic means responsive to the speed of said motor for open-circuiting one of said coils and for short-circuiting another of said coils.

5. The combination with a single-phase motor comprising a main field-magnet winding, and an auxiliary starting winding, of a device for controlling the operation of said motor comprising inductively related coils, one of said coils being connected to said main field magnet winding and the other of said coils being connected to said auxiliary winding, and automatic means operating to de-energize said coils at a predetermined time.

6. The combination with a single-phase motor comprising a main field-magnet winding and an auxiliary starting winding, of a device for controlling the operation of said motor comprising inductively related coils, one of said coils being connected to said main field-magnet winding and the other of said coils being connected to said auxiliary winding, and automatic means responsive to the speed of said motor for rendering negligible the inductive effect of said starting device by removing the same from operative relationship with said main field-magnet winding.

7. The combination with a single-phase motor comprising a main-field-magnet winding and an auxiliary starting winding, of a device for controlling the operation of said motor comprising inductively related coils, one of said coils being connected to said main field-magnet winding and the other of said coils being connected to said auxiliary winding, and automatic means to de-energize said coils when said motor attains a predetermined speed, said means operating to short-circuit the coil connected to the main field winding and to open-circuit the auxiliary field winding.

In testimony whereof, I have hereunto subscribed my name this 26th day of June, 1918.

CLIFFORD A. M. WEBER.